Patented May 27, 1924.

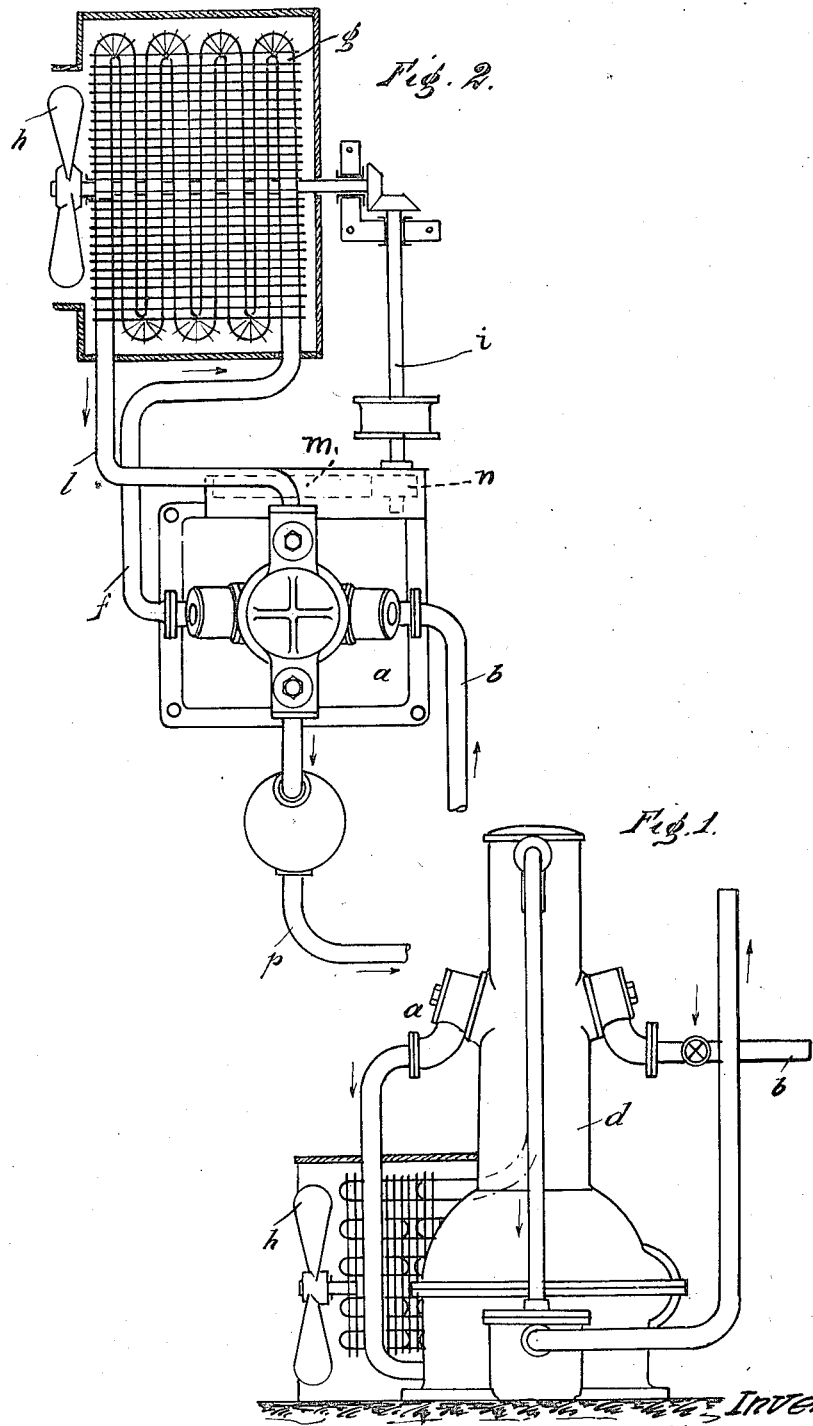

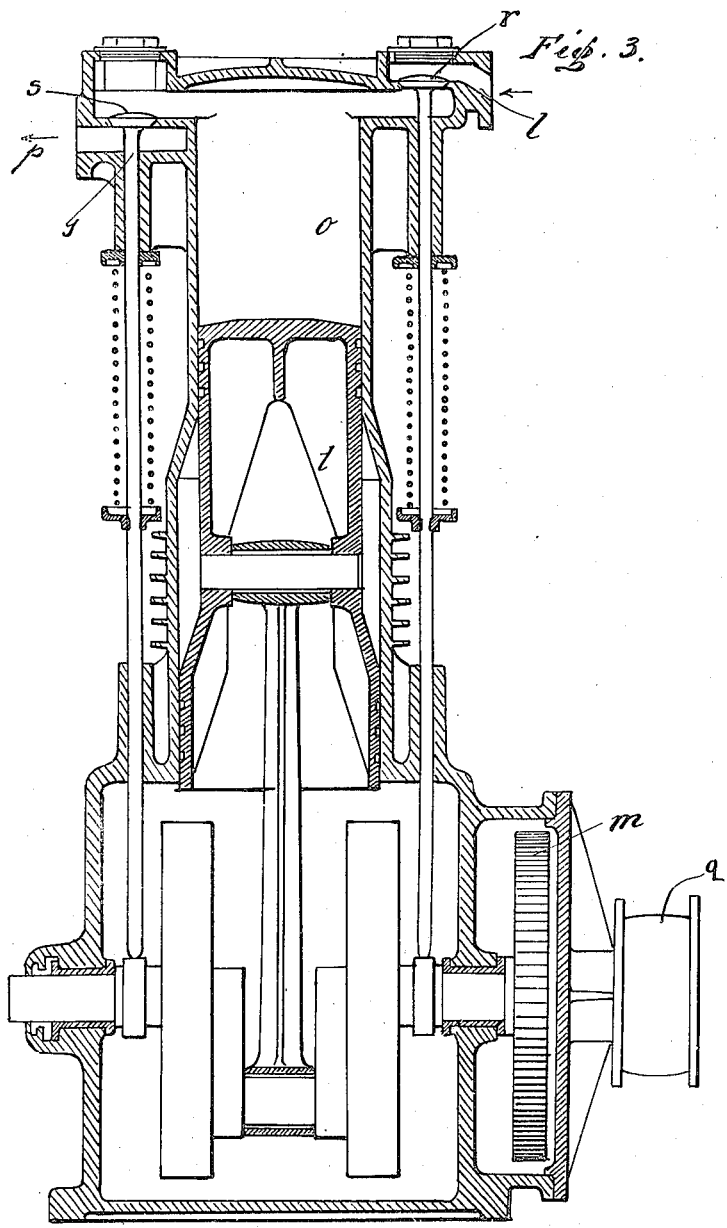

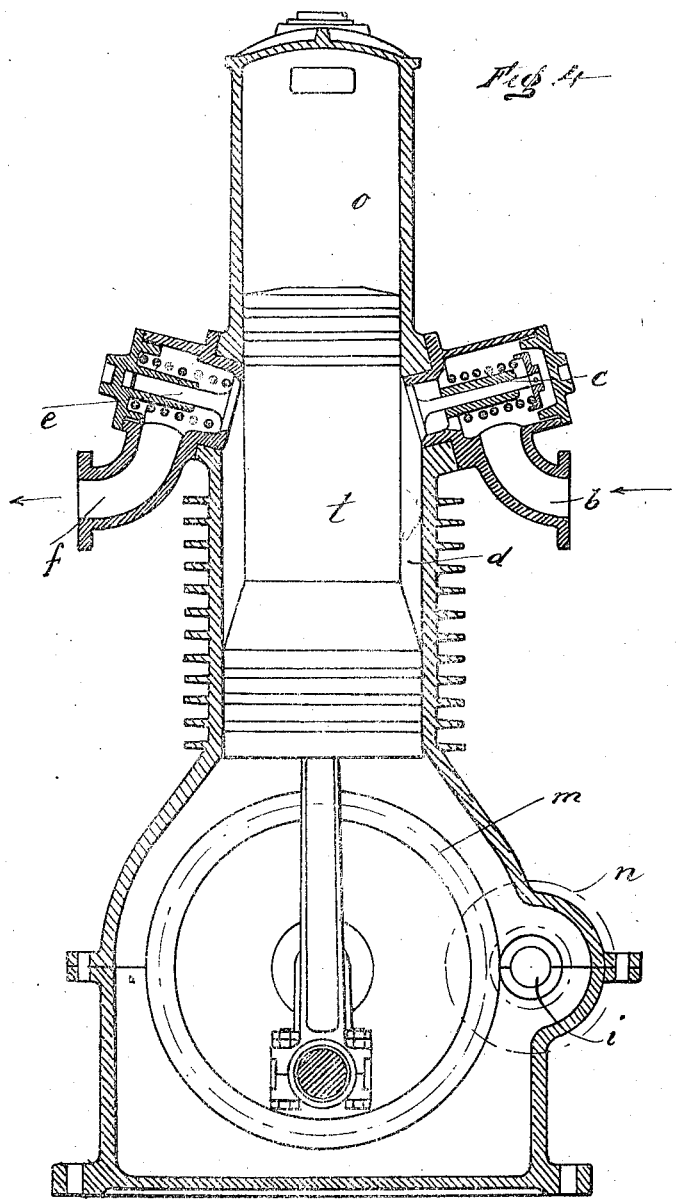

1,495,663

UNITED STATES PATENT OFFICE.

GIUSEPPE BELLUZZO, OF MILAN, ITALY.

COOLING PLANT.

Application filed September 9, 1922. Serial No. 587,198.

*To all whom it may concern:*

Be it known that I, GIUSEPPE BELLUZZO, subject of the King of Italy, residing at Milan, in the Kingdom of Italy, have invented certain new and useful Improvements in Cooling Plants, of which the following is a specification.

The object of the present invention is a cooling plant consisting of a fluid compressing and expanding set which can be operated without the use of brine or ammonia liquors, so as to be capable of working anywhere where power is available, simply by the transformation of mechanical energy into thermic energy, and by the absorption of the latter during expansion.

The attached drawing illustrates an example of one way of actuating the invention.

Fig. 1 is an elevation of the compression and expansion set and of the annexed radiator for cooling the compressed air.

Fig. 2 is a plan view of same.

Fig. 3 is a sectional view of the compression and expansion set.

Fig. 4 is another sectional view.

The plant consists of a compression and expansion set —a— which, in the example illustrated, is arranged in the same framework, so that the expansion cylinder and the compressor cylinder form one body, although they could be separated and connected by piping; the air of the surrounding space, which has to be cooled, is sucked in through the pipe —b—, entering through the valve —c— into the compressor cylinder —d—, leaving the latter in a compressed state through the valve —e— and passing through the pipe —f— to the air cooling coil —g—, which is acted upon by a fan —h—, turned, for example, through the main axle —i— which, by means of the pinions —m—n— transmits the movement from the crank rod of the compression and expansion set; —l— is a pipe which carries the compressed and cooled air to the expansion cylinder —o—, from whence, after having expanded and consequently further cooled, the air passes through the pipe —b— out into the space to be cooled, subsequently returning to the compressor and thus completing the cycle.

In the case illustrated in Figures 3 and 4, the axle —d— may be rotated by a pulley —q—, or by a motor coupled directly on the axle itself. The valves —c— and —e— are automatic; the valves —r— and —s—, which control the inlet and the outlet of the expansion cylinder, are operated by means of cams fixed on the crank axle, or in any other manner; the piston —t— is differential, and in one piece, and consequently works in two cylinders of different diameters.

The two cylinders, may, however, belong to separate machines, being connected by means of piping for the fluid and through mechanical organs, or any other equivalent means, for the transmission of the movement.

Having now particularly described and ascertained the nature of the said invention and in what manner the same is to be performed, I declare that what I claim is:—

A cooling plant including a cylinder having a large chamber and a small chamber, a differential piston working in these chambers, a drive shaft, means connecting the drive shaft to the piston for reciprocating the latter, an air inlet for the large chamber provided with an inwardly open check valve, an air outlet for the large chamber provided with an outwardly open check valve, a cooling coil communicating with the air outlet, a fan for forcing air past the cooling coil, means driven by said shaft for actuating said fan, an air inlet for the small chamber communicating with said cooling coil, a valve controlling the last mentioned air inlet, means for actuating said valve from said shaft, an air outlet for the small chamber, a valve controlling the last mentioned outlet, and means actuated by the shaft for controlling the last mentioned valve.

Signed at Milan (Italy), this 19th day of August, 1922.

GIUSEPPE BELLUZZO.